United States Patent [19]
Taylor et al.

[11] Patent Number: 4,679,203
[45] Date of Patent: Jul. 7, 1987

[54] MAGNETICALLY INDUCED PULSER LASER EXCITATION SYSTEM

[75] Inventors: Roderick S. Taylor, Gloucester; Kurt E. Leopold, Carp, both of Canada

[73] Assignee: Canadian Patents and Development Limited, Ontario, Canada

[21] Appl. No.: 745,652

[22] Filed: Jun. 17, 1985

[51] Int. Cl.[4] .................. H01S 3/097; H01S 3/223
[52] U.S. Cl. ........................................ 372/86; 372/57
[58] Field of Search .......................... 372/86, 87, 57

[56] References Cited

U.S. PATENT DOCUMENTS 4,275,317 6/1981 Laudenslager et al. ............ 307/415
4,498,183 2/1985 Levatter ............................. 372/86

OTHER PUBLICATIONS

R. S. Taylor "Time-Dependent Gain and Absorption in a S J UV Preionized XeCl Laser" IEEE Jour. of Quantum Elect., vol. QE-19, No. 3, Mar. 1983, pp. 416-425.
Levatter, J. I. "Long Pulse Behavior of the Avalanche/Self Sustained Discharged Pumped XeCl Laser" Applied Physics Letter, vol. 39, No. 4, Aug. 15, 1981, pp. 297-299.
J. R. Reilly "Pulse/Sustainer Electric Discharge Laser" Journal of Applied Physics, vol. 43, No. 8, Aug. 1972, pp. 3411-3416.
W. H. Long, Jr., et al., "Efficient Discharge Pumping of an XeCl Laser Using a High Voltage Repulse" Applied Physics Letter, vol. 43, No. 8, Oct. 15, 1983, pp. 735-737.
R. S. Taylor et al., "Magnetically Induced Pulser Sustainer Laser Excitation" CLEO '84, Jun. 19-22, 1984.
R. S. Taylor et al., "Magnetically Induced Pulser Laser Excitation" Applied Physics Letters, vol. 46, No. 4, Feb. 15, 1985, pp. 335-337.
R. S. Taylor et al., "Microsecond Duration Optical Pulses from UV-Preionized XeCl Laser" Applied Physics Letters, vol. 47, No. 2, Jul. 15, 1985, pp. 81-83.

Primary Examiner—Gene Wan
Attorney, Agent, or Firm—Yoshiharu Toyooka

[57] ABSTRACT

A novel excitation scheme has been developed for discharge lasers. The technique uses an auxiliary circuit based upon pulse transformer technology to induce a fast, high voltage pulse directly onto a ground potential laser electrode resulting in the breakdown of the laser gas mix. Saturation of the pulse transformer core inductance then permits the efficient "switching" of the main energy storage circuit into the discharge.

19 Claims, 10 Drawing Figures

MAGNETICALLY INDUCED PULSER LASER EXCITATION SYSTEM

THE FIELD OF THE INVENTION

The present invention is directed generally to techniques of exciting a laser. In particular it relates to a method and apparatus for exciting a laser by means of a magnetically induced pulser circuit.

BACKGROUND OF THE INVENTION

Multijoule, output energy excimer avalanche discharge lasers which are also capable of high average power operation are potentially useful in applications such as laser marking of metals, laser processing of semiconductor materials and large scale UV photolithography. Considerable success has been obtained in scaling the output energy of excimer lasers using low impedance pulse forming lines (PFL's) charged to high voltages together with low inductance transfer switches to isolate the PFL from the laser head. Closure of the transfer switch generates a very fast risetime voltage pulse across the laser electrodes resulting in a gas breakdown voltage well in excess (typically $\times 5$) of the steady-state discharge voltage ($V_s$). These highly overvolted discharges are both volume scalable and stable for relatively long periods of time (100-200 ns). See IEEE Journal of Quantum Electronics, Vol. QE-19, p. 416 (1983) by R. S. Taylor et al and Appl. Phys. Lett. Vol 39, p. 297 (1981) by J. L. Levatter et al. A magnetic switch can also be used as a transfer gap as taught in U.S. Pat. No. 4,275,317, June 23, 1981 (Frosch et al). In the early 1970's auxiliary spiker or pulser circuits were used to sustain low pressure $CO_2$ laser discharges. See J. Appl. Phys. Vol. 43, NO. 8 August 1972 p. 3411 et seq. by J. P. Reilly. Recently a similar circuit was used in conjunction with the PFL-rail-gap switch excitation scheme to generate a high voltage pulse across a pair of XeCl laser electrodes to initiate gas breakdown. See Appl. Phys. Lett. Vol. 43 p. 735 (1983) by W. H. Long, Jr. et al. Since the voltage on the PFL was not required to break down the gas, the PFL could be charged to 2 $V_s$ in order to satisfy the impedance matching conditions for a constant voltage laser load. The improved energy transfer efficiency from the PFL to the XeCl discharge made possible by impedance matching resulting in a $\sim 3\%$ overall (including the pulse circuit) electrical to optical efficiency. However with this and other scaling approaches involving transfer gaps, the switch must transfer the entire energy stored on the PFL. For single-shot applications, this does not pose a serious problem; however, for high average power applications, concerns about switch reliability and lifetime can best be addressed if the voltage and the energy transferred by the switch are reduced.

OBJECTS OF THE INVENTION

It is therefore one of the objects of the present invention to provide an energy efficient volume scalable laser excitation method and apparatus which does not require a transfer switch.

It is a further object of the present invention to provide an avalanche discharge excitation method and apparatus which permit the production of microsecond duration excimer optical pulses.

SUMMARY OF THE INVENTION

According to the present invention, a laser excitation system which includes primary energy storage means for storing a sufficient electrical energy for the operation of the excimer laser having first and second electrodes and containing a gas mixture. Preionization means are provided to preionize the gas mixture. Energy transfer means connect the primary energy storage means and the first electrode in an impedance matching manner for transferring the sufficient electrical energy between them in the form of a main discharge voltage pulse. The system further has trigger pulse generating means forming a part of the primary energy storage means and for generating a trigger pulse in response to the main discharge voltage pulse and secondary energy storage means for storing an electrical energy. There are also provided electromagnetic energy transfer means connected between the secondary energy storage means and the second electrode for transferring electromagnetically the electrical energy between them in the form of a high voltage pulse and switching means connected to the electromagnetic energy transfer means for initiating the electromagnetic energy transfer in response to the trigger pulse. The high voltage pulse breaks down the gas mixture. The main discharge voltage pulse is longer in duration than the high voltage pulse and these two pulses are coincidental for a period of time to produce gas breakdown in the laser and to permit the said energy transfer means for transferring the sufficient energy from the primary energy storage means to the laser.

According to another aspect of the invention, a method of exciting a laser having first and second electrodes containing a gas mixture includes steps of preionizing the gas mixture, storing a sufficient electrical energy in primary energy storage means for the operation of the laser, and transferring the sufficient electrical energy in an impedance matching manner between the primary energy storage means and the first electrode in the form of a main discharge voltage pulse. The method further includes steps of generating a trigger pulse in response to the main discharge voltage pulse and storing an electrical energy in secondary energy storage means. There are provided steps of transferring electromagnetically the electrical energy between the secondary energy storage mans and the second electrode in the form of a high voltage pulse which breaks down the gas mixture and initiating the electromagnetic energy transfer in response to the trigger pulse. The main discharge voltage pulse is longer in duration than the high voltage pulse and the two pulses are coincidental for a period of time to produce gas breakdown in the laser and to permit the transfering of the sufficient energy from the primary energy storage means to the laser.

The present inventors presented a paper describing essentially the present invention at the Conference on Lasers and Electronics-Optics on June 19-22, 1984, Anaheim, Calif.

BRIEF DESCRIPTION OF THE DRAWINGS

The foregoing and other objects and features of the invention may be readily understood with reference to the following detailed description taken in conjunction with the accompanying drawings, in which.

DETAILED DESCRIPTION OF THE PREFERRED EMBODIMENTS

Figure 1:
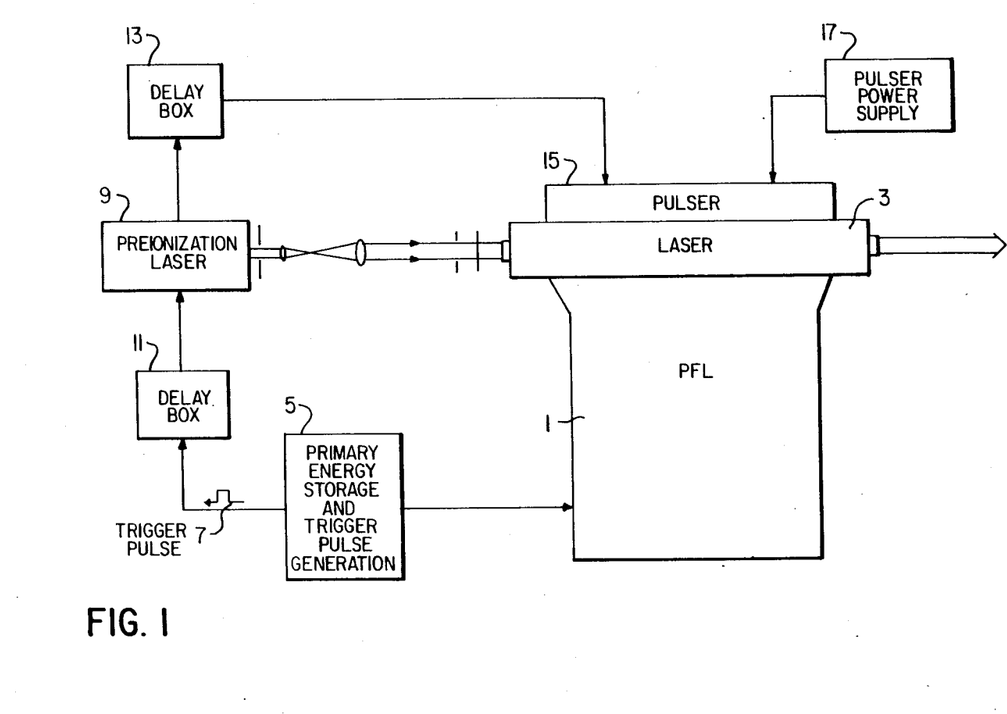
FIG. 1 is a schematic diagram showing an XeCl excimer laser excitation system according to the present invention.

Referring to FIG. 1 of the drawings, an XeCl excimer laser excitation system embodying the present invention is schematically shown. A de-ionized water-dielectric PFL (pulse forming transmission line) 1 is connected at its one end to one of the electrodes of the excimer laser 3 and at its other end to a matched primary energy storage means 5 which include among other things storage capacitors and trigger pulse generating means for generating trigger pulses 7. The trigger pulse 7 is applied to a pre-ionzation laser 9 such as Lumonics [trademark] TE-861T KrF laser via a delay box 11 and is further applied to switching means such as a rail-spark-gap switch via another delay box 13. The switching means are contained in a multistage pulser means 15 and form a part thereof. A DC pulser power supply 17 is provided to supply the electrical energy to be stored in a secondary energy storage means contained also in the pulser means 15 to form a part thereof. The pulser means 15 is connected to another of the excimer laser electrodes to apply a high voltage pulse thereto in response to the trigger pulse.

UV radiation emitted by the pre-ionization laser 9 is directed into the XeCl excimer laser 3 which contains a few parts per million of low ionization potential fluorobenzene vapour. The PFL 1 is charged to about 2 $V_s$ in about 1 $\mu$s from the primary energy storage capacitors. When the PFL voltage is at a maximum, a few mJ/cm$^2$ of UV radiation from the pre-ionization laser 9 is directed into the XeCl excimer laser 3. The UV radiation results in the two photon ionization of the fluorobenzene and the production of electron densities $\sim 10^7$ cm$^3$ sufficient for pre-ionization. Finally shortly after the pre-ionization of the XeCl laser 3, a 5 kV/ns voltage trigger pulse applied to the switching means triggers a three electrode rail-spark-gap switch which initiates the transfer of the electrical energy stored in the secondary energy storage means in the form of a high voltage pulse resulting in gas breakdown in the excimer laser and the onset of the main discharge by means of the energy stored in the primary energy storage means.

Figure 2:
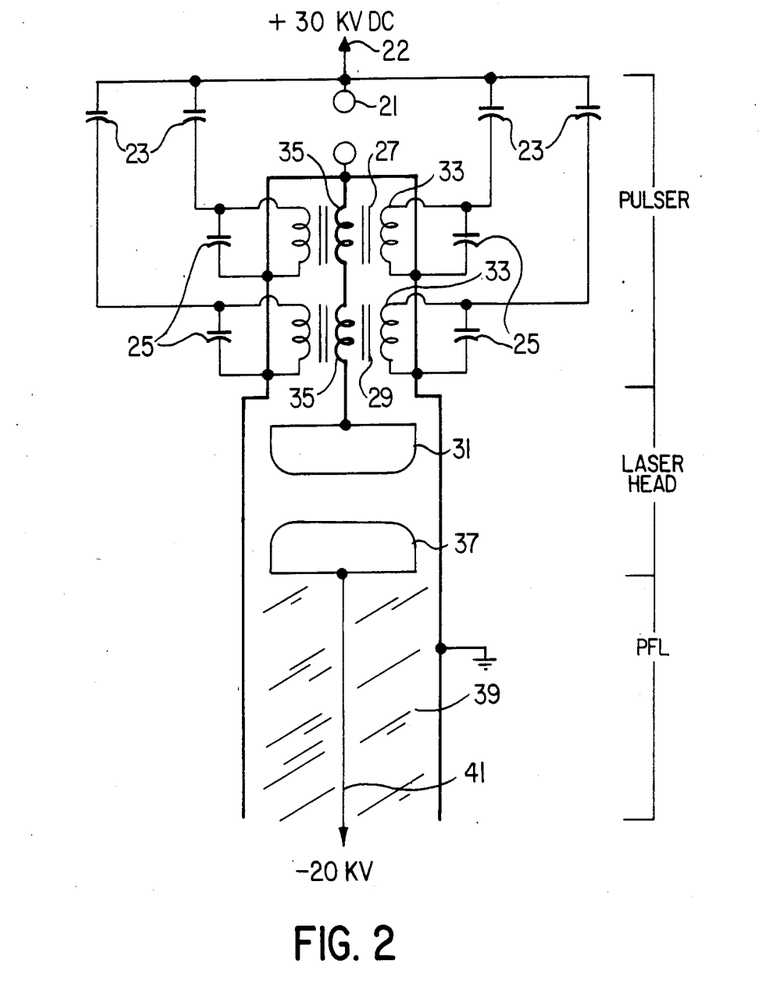
FIG. 2 is a diagram showing the multistage pulser circuit according to one embodiment of the present invention.

FIG. 2 shows diagramatically the multistage pulser means 15 shown in FIG. 1 in more detailed fashion in relation to the laser head of the excimer laser 3 and the PFL 1. A number of ceramic capacitors 23 ($\sim$2,700 pF) functioning as the secondary energy storage means are distributed on either side of and down the length of the rail-spark-gap switch 21 and are charged by the 30 kV DC supply through a connector 22. With the closure of the switch 21, the ceramic capacitors 23 are discharged to generate the primary current in two 1:1 transformers. Secondary capacitors 25 ($\sim$560 pF) are used to tune the voltage risetime on the transformer cores 27 and 29 to obtain maximum voltage hold-off. The primary current produces a flux swing ($\Delta B$) in the top core 27 and a voltage nearly equal to the DC voltage is induced on the secondary between the ground point at the base of the switch 21 and the bottom of the core 27. A similar voltage pulse is simultaneously induced across the second core 29. The net result is the production of a fast voltage pulse at the top laser electrode 31 with twice the magnitude of the DC voltage. Since the primary and secondary conductors 33 and 35 respectively are grounded at the same point and are wound in opposite directions around the cores 27 and 29, the negative polarity pulse at the capacitors 25 is inverted in the secondary 35. The pulser means 15 therefore generates a fast high voltage via cascaded pulse transformers onto an initially ground potential electrode to break down the laser gas mix. The pulser means according to the invention, supplies sufficient energy into the discharge to drop the discharge impedance from a very high level to a very low level (e.g. $\sim 1\Omega$). The energy stored in the ceramic capacitors is large enough and is delivered to the transformer primary conductors rapidly enough to fully saturate the transformer cores and to drop the core inductance. A fast reduction in the core inductance permits the rapid "switching" of the energy from the primary energy storage means into the discharge. The lower electrode 37 of the laser is directly connected to the PFL 39 and is charged at $-20$ KV through the center conductor 41. There are no intervening transfer switches or the like between the lower electrode 37 and the PFL 39. The voltage on the primary energy storage means is directly applied to the lower electrode and is also chosen to be about 2 $V_s$ for impedance matching and efficient energy transfer into discharge.

Figure 3:
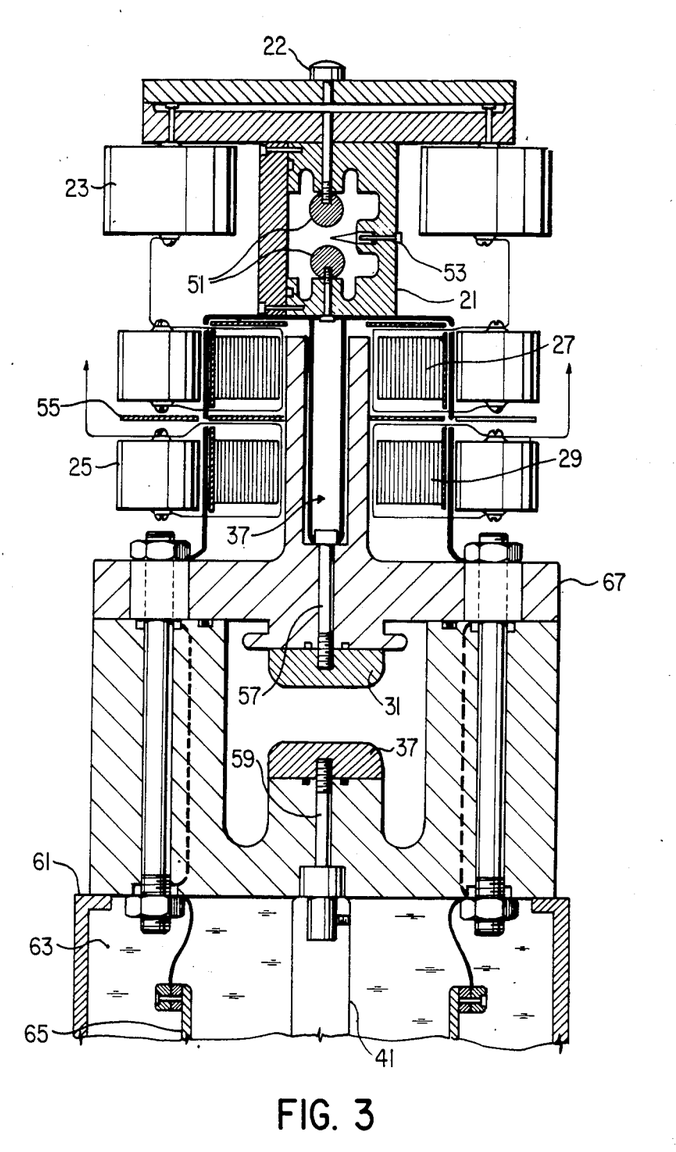
FIG. 3 shows a cross section of the apparatus according to the present invention illustrating the parts shown in FIG. 2.

FIG. 3 is a cross section of the apparatus according to the present invention showing in details the part illustrated in FIG. 2. In the FIGS. 2 and 3, like numerals are used to designate like components. FIG. 3 shows a connector 22 for the DC voltage, DC charged ceramic capacitors 23, brass electrodes 51 of a gas insulated rail-gap switch 21 which has a field distortion trigger electrode 53 and magnetic cores 27 and 29 of the pulse transformers, one stacked on top of the other. The figure further includes a Plexiglas [trademark] insulation 55, pulsed charged ceramic secondary capacitors 25 and secondary conductors 35 of the transformers connected directly to the laser electrode 31 via a brass feed 57. Another brass feed 59 connects the other laser brass electrode 37 to the PFL. An aluminum water tank 61 holds a body of deionized distilled water 63 within which copper ground planes 65 and the iridited aluminum center conductors 41 of the PFL are located. A Hysol [trademark] epoxy laser head is shown at 67.

The two magnetic cores shown in the previous figures were wound from 2.5 cm wide, 25 $\mu$m thick unannealed metallic glass ribbon (Metglas [trademark] 2605SC). A 5 $\mu$m layer of Mylar [trademark] was used as insulation between each Metglas [trademark] layer. For a given flux swing $\Delta B$ (tesla) in the core the minimum cross sectional area A (m$^2$) of saturable core material which can hold off a given volt-sec product is given by:

$$V\Delta t = \Delta BA \tag{1}$$

An appealing feature of the metallic glass ribbon material is its large flux swing ($\sim 2T$ for a pulsed core reset and ~3T for DC reset) which should permit the use of small cross sectional area cores. This not only should reduce the core inductance but also reduce the core volume and therefore the core dissipation. Another feature of the metallic glass ribbons is the ease in winding them into different geometries. In this experiment the cores were wound into a racetrack geometry with a relatively long magnetic path length of 1.7 m. to further reduce the core inductance. However during the course of the experiment, it was determined that the metallic glass ribbon wound cores had some serious drawbacks for short duration (<40 ns) pulser operation. Current and voltage measurements obtained using the pulser with a matched resistive dummy load indicated that ~40% of the pulser energy was dissipated in the cores. This percentage translates into a ~3 kJ loss per m$^3$ of core material. Furthermore the magnetic field intensity H required to substantially saturate the cores ($H_s$) and intensity to drop the core permeability ($\mu_r$) to approximately five times the free space permeability ($\mu_o$) were very high, necessitating a relatively high energy storage in the pulser circuit. Finally for pulses reset conditions, a core area of A=6.5 cm$^2$ was needed to achieve the necessary volt-sec product. This value is over twice that predicted using Eq. 1 and a $\Delta B=2T$. All of these problems result from the incomplete saturation of the core material due to the inability of the magnetization flux to fully penetrate the entire thickness of each ribbon over the short duration of the applied voltage pulse.

A comparison was made between Metglas and a general high frequency ferrite (CMD5005 from Ceramic Magnetics). A racetrack core geometry was formed by butting two 2.5×5×32 cm$^3$ ferrite bricks together with a 25 cm×0.2 mm slot between them. The test circuit consisted of an array of DC charged 560 pF capacitors, which was switched by the same rail-gap switch used for the Metglas tests, to pulse charge a series of six foot long RG-8 cables which were connected to one side of the ferrite core. The other side of the core was connected to a resistive load. A low inductance current viewing resistor was used to measure the current in the load, while a resistive divider probe measured the load voltage. Similar voltage pulses to those shown in FIGS. 4a and 6a, were used to obtain the magnetic data recorded in Table 1. The ferrite dissipation was estimated from the reduction in the energy transferred to the load as the core volume was doubled. This procedure eliminated the uncertainty in the switch loss which was considerably larger than the core loss. As Table 1 indicates the effective flux swing for the ferrite material is the full 0.5T anticipated from the company's low frequency data sheets.

TABLE 1

| HIGH FREQUENCY MAGNETIC PROPERTIES | | |
|---|---|---|
| | Metglas (2605SC) | Ferrite (CMD 5005) |
| $\Delta B^a$ | 1 T | 0.5 T |
| $H_s$ | 12 kA/m | 2 kA/m |
| $H(\mu_r \sim 5\mu_o)$ | 40 kA/m | 5 kA/m |
| Dissipation | 3 kJ/m$^3$ | 0.1 kJ/m$^3$ |

[a]effective $\Delta B$ swing with a pulsed core reset.

The value of $H_s=2$ kA/m is well below that obtained with the Metglas ribbons. The estimated core dissipation is also very low ~0.1 kJ/m$^3$. This value corresponds to a 4% loss of the stored pulser energy. It would therefore seem that an appropriately chosen high frequency ferrite is superior to the Metglas ribbons for fast pulse laser applications. Ferrite bricks are presently being tested out in our lasers with the hope of achieving improved performance. It is probably fair to say that the future success of Metglas in fast (<40 ns) discharge lasers will depend on the use of thin (e.g. <0.5 mil) annealed ribbons to permit a more uniform and complete penetration of the magnetic flux. However even with existing material metallic glass ribbons can be successfully employed in lasers which can be adequately excited with longer voltage pulses (e.g. 100 ns).

Figure 4A:
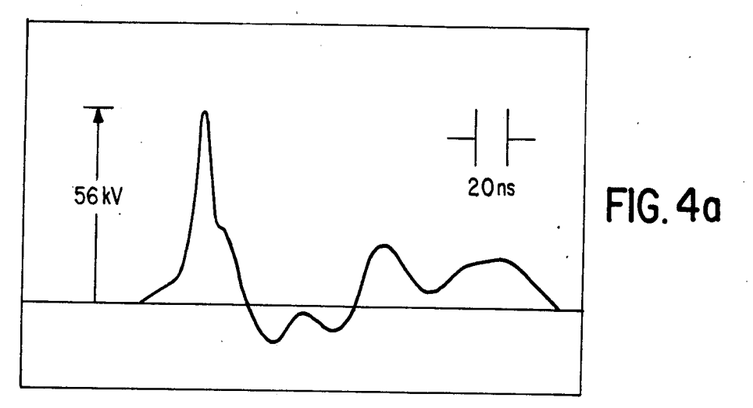
FIGS. 4(a) and 4(b) are graphs showing voltage pulses of the pulser means and the PFL respectively.

FIG. 4(a) shows the positive polarity pulse measured after the cores relative to the outer ground plane. The pulse risetime (10-90%) is ~20 ns while the peak voltage is indeed nearly twice the DC voltage. Furthermore the risetime of this voltage is equal to the risetime of the induced voltage at each stage. It is therefore possible to use many transformer stages to generate very high voltage pulses directly onto one of the laser electrodes without sacrificing risetime. It should also be noted that since the pulser voltage is induced on a ground electrode, direct isolation of the pulser circuit from the main discharge circuit is achieved.

Figure 4B:
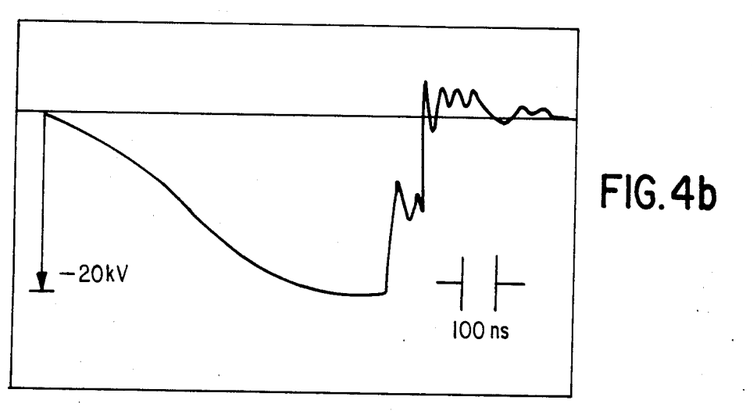

FIG. 4(b) shows the PFL voltage. FIGS. 4(a) and 4(b) indicate that once the pulser voltage has collapsed to ground potential the PFL voltage falls sharply to a steady-state voltage (~0.8 kV/cm-atm) for a period equal to the electrical transit time of the PFL (75 ns). When the PFL and pulser voltages were of opposite polarities as in the figures the rapid collapse in PFL voltage only occurred when the cores were driven by a ringing primary current. A ringing current was not necessary for the case of identical polarities although higher pulse voltages were of course required to achieved gas breakdown. For both cases uniform laser burn patterns were obtained and visual inspection of the discharge through the output window as well as transverse to the discharge through a semitransparent laser head indicated that the discharge was free of arcs or hot filaments and appeared to be a good "glow" discharge.

When the present pulser circuit was tested in an XeCl laser wih 3 Torr HCl, 27 Torr Xe and 5 atm Ne, a 2.5×1.4×72 cm$^3$ discharge produced an output energy of 0.63 J (2.5 J/l). The electrical to optical efficiency based on the energy stored in the primary DC charged capacitors was 3.4%. However, when the energy stored in the pulser circuit was included, the overall efficiency was ~2%.

While the two stage pulser means have been discussed so far, as mentioned earlier, it is possible to increase the number of the transformers to generate higher pulse voltages. It has been described that the present invention finds the main application in the excitation of excimer lasers. However early indications are that other types of gas lasers can be successfully operated by the present excitation technique.

Figure 5:
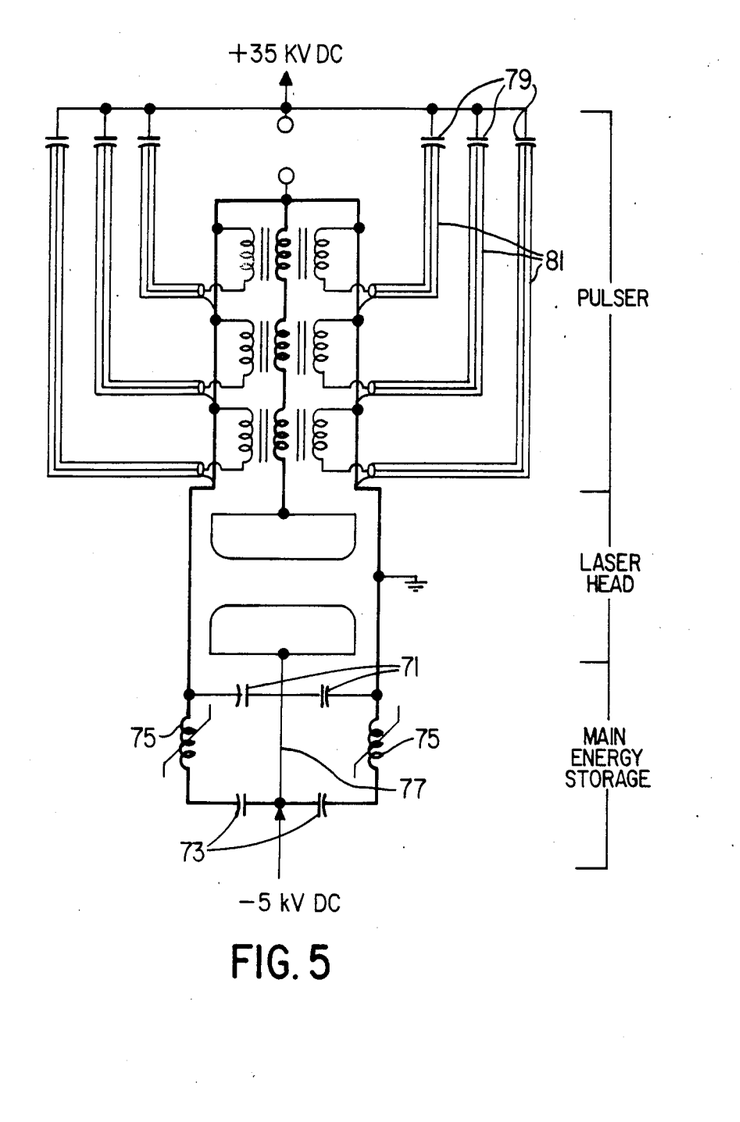
FIG. 5 is a circuit diagram illustrating the pulser circuit, laser head and primary energy storage according to another embodiment of the present invention.

The technique can also be used to generate very long excimer optical pulses. FIG. 5 illustrates diagramatically a three-stage pulser circuit. The figure also includes the laser head and the primary energy storage formed by 1st capacitors 71, 2nd capacitors 73, saturable inductors 75 and the central conductor 77. An array of thirty DC charged ceramic capacitors 79 were distributed about three 1:1 pulse transformers and a series of RG-8 coaxial cables 81 connected the ceramic capacitors and the transformer primaries. The transformer cores were wound in a racetrack geometry from 2.5 cm wide, 18 μm thick Metglas [trademark] 2605 SC metallic glass ribbons. The cross-sectional area of each core was 2.6 cm² while the magnetic path length was ~0.8 m. In principle the voltage induced at each stage can be made very close to the DC voltage on the ceramic capacitors. However the three-stage transformer network shown in FIG. 5 which was designed and optimized for a previous experiment involving the two-stage transformers, lacked sufficient core cross-sectional area to produce the full voltage. A DC voltage of 35 kV resulted in 70 kV, 20 ns risetime open circuit voltage pulse at the top electrode. However this voltage was more than adequate for the operation of an excimer laser since the gas breakdown voltage never exceeded 45 kV.

The second laser electrode was directly attached by conducting feedthroughs to an array of capacitors connected in parallel and maintained at a DC potential typically 80–85% of the gas self-breakdown voltage. A reasonable high DC breakdown voltage (~0.6 kV/cm-atm) was achieved by carefully contouring the electrodes and eliminating any sources of corona. Since the pulser circuit is coupled to ground through the main discharge capacitor it was not possible to store the main discharge energy in one or two large capacitors. In order to ensure a distributed uniform pulser discharge four 100 nF capacitors 71 were distributed down the length and closely coupled to the bottom electrode. The remaining considerably larger valued capacitors 73 were then connected in parallel to these capacitors. It should also be mentioned that the function of the pulser circuit was not solely to break down the gas. It must also supply enough energy to the discharge to lower the discharge impedance to the ohm level and permit the main energy storage capacitors to discharge. Since the transformer cores are in the main discharge loop (shown as heavy lines in FIG. 5) they represent a very large inductance which can limit the main discharge current risetime. In order to avoid this problem these cores must act like good saturable inductors; that is, as the discharge current increases the core permeability and hence the core indctance must decrease to approach the inductance imposed by the geometry of the transformer layout. The Metglas [trademark] cores used in this embodiment required a magnetic field intensity <40 KA/m on the core primary to fully saturate the inductance. However for very long excitation duration experiments, a slowly saturating core inductance can be used to advantage by limiting the current drain on the main capacitors and extending the duration of the power deposition.

Figure 6A:
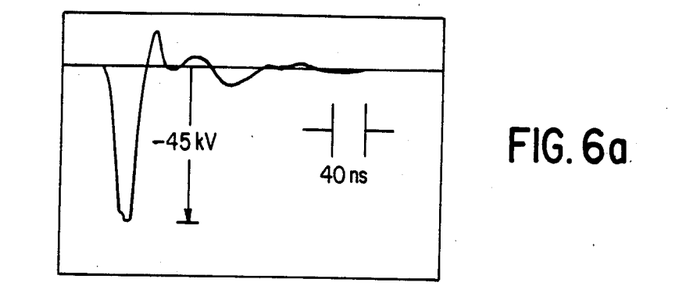
FIGS. 6(a), 6(b), 6(c) and 6(d) are graphs showing various pulses obtained from the other embodiment shown in FIG. 5.
Figure 6B:
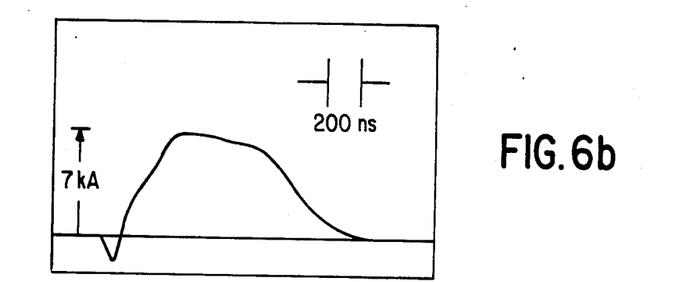
Figure 6C:
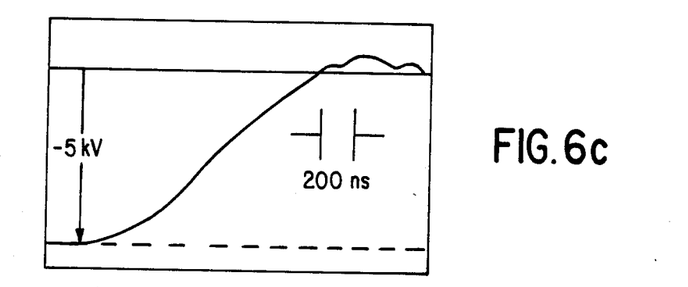

FIG. 6(a) shows the negative polarity pulser voltage waveform which was used to break down a 4 atm Neon based XeCl laser gas mix. Note that once breakdown has occurred the voltage on the top electrode rapidly returns to ground potential. FIG. 6(b) shows the pulser and the main discharge current measured using a current viewing resistor located in the outer ground plane. The pulser current is in the opposite direction to the main discharge current since the pulser current measured on the secondary is opposite in polarity to that on the primary. In FIG. 6(c) the voltage waveform measured on the negatively DC charged main capacitors is shown as it decays slowly to ground potential indicative of a damped capacitor discharge. In order to achieve even longer current and voltage pulses, the value of the capacitance was increased and ferrite toroids were inserted in series with individual capacitors and used as saturable inductors 75 in FIG. 5 to appropriately delay the discharge of each capacitor. By tailoring the current pulse to slowly rise as the voltage on the capacitors falls the power deposition can be kept at a reasonable level for several microseconds.

The laser gas mix was of course an important consideration in achieving long optical pulses. The use of Neon rather than Helium as the buffer gas resulted in superior discharges and considerably longer optical pulses. However a framing camera study of the discharge indicated that even for the Neon based gas mixes filaments form at the cathode in the first 100 ns of the discharge followed soon after by filaments originating at the anode. As the discharge continues the filaments narrow and extend away from each electrode leading to a progressive but not a catastrophic collapse in the "glow" discharge region both in the electric field and transverse to the field direction. Our framing camera study shows that it is serious filamentation which is primarily responsible for the termination of the optical pulse. In order to reduce the impact of filamentation, in addition to such considerations as uniform preionization, the use of a very uniform highly overvolted pulser discharges and slow energy feed into the discharge, it was necessary to use a low HCl concentration. A reduction in the Xe concentration was also required to prevent a lowering of the discharge impedance and therefore a more rapid discharge of the main capacitors. In this manner volume discharges ($2.5 \times 1.5 \times 70$ cm³) lasting up to 2 µs were obtained at power deposition levels of ~50 kW/cm³.

Figure 6D:
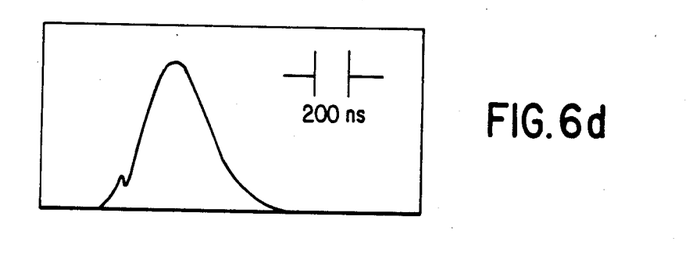

The XeCl resonator consisted of a 10 m radius of curvature total reflector together with a flat output coupler. The reflectivity ($\rho$) of the coupler was chosen where possible to optimize the laser pulse duration and output energy. As seen in FIG. 6(d) an output energy ($\rho=66\%$) of 400 mJ (1.5 J/l) was obtained in a 400 ns duration (FWHM) pulse using a gas mix of 8 Torr Xe, 0.6 Torr HCl and 4 atm Ne. The current and voltage waveforms shown in FIG. 6 demonstrate that the lasing does not prematurely terminate as has been observed in the past but extends over the full duration of the electrical power deposition. The efficiency based on the energy stored in the DC charged (5 KV) capacitors (1.2 µF) and including the energy deposited into the discharge from the pulser circuit was ~2%. As mentioned previously, longer power deposition durations were obtained by simply increasing the circuit inductance and capacitance and therefore the main energy storage discharge time constant. However in order to achieve long optical pulse operation the discharge energy loading had to be kept below 50 J/l. Therefore as the capacitance was raised the DC voltage was appropriately lowered. A reduction in the voltage resulted in the optimum pulse duration occurring at lower pressures. A pulse duration of 750 ns (FWHM) and an energy of 100 mJ were obtained with C=2 µF, $V_{DC}$=3.5 kV, $\rho$=90% and with 5 Torr Xe, 0.4 Torr HCl and 3 atm of Ne. A further increase in the capacitance to 6 µF and a reduction in the voltage and gas pressure to 1.5 kV, 2 atm, respectively, resulted in a 5 mJ, ($\rho$=99.3%) 1.5 µs (FWHM) pulse duration. Since suitable reflectors were unavailable to fully optimize the output energy for the 1.5 µs duration pulse, significant improvements in performance can be expected.

It should be noted that the technique of laser induced preionization was chosen for convenience in the above embodiments; however other short duration preionization schemes can be used. Indeed due to the high dV/dt induced on an initially ground electrode in the pulser circuit, corona preionization would seem to be ideally suited to this circuit.

We claim:

1. An apparatus for exciting a laser having first and second electrodes and containing a gas mixture therein, comprising:

preionization means for preionizing the gas mixture, primary energy storage means for storing a sufficient electrical energy for the operation of the said laser, energy transfer means connecting the primary energy storage means and the first electrode in an impedance matching manner for transferring the said sufficient electrical energy therebetween in the form of a main discharge voltage pulse, trigger pulse generating means forming a part of the said primary energy storage means and for generating a trigger pulse in response to the said main discharge voltage pulse, secondary energy storage means for storing an electrical energy, electromagnetic energy transfer means connected between the secondary energy storage means and the second electrode for transferring electromagnetically the electrical energy therebetween in the form of a high voltage pulse which breaks down the gas mixture, switching means connected to the electromagnetic energy transfer means for initiating the electromagnetic energy transfer in response to the trigger pulse, the main discharge voltage pulse being longer in duration than the high voltage pulse, and the said two pulses being coincidental for a period of time to produce gas breakdown in the laser and to permit the said energy transfer means for transfering the sufficient energy from the primary energy storage means to the laser.

2. The apparatus for exciting a laser according to claim 1 wherein the electromagnetic energy transfer means comprise:

at least one pulse transformer, each having a primary conductor and a secondary conductor and magnetically coupled with each other via a transformer core, the said at least one pulse transformer being connected in series with each other with respect to the secondary conductors, one end of the secondary conductors of the pulse transformers being connected to the second electrode of the laser, the other end of the secondary conductors being connected to the ground and the primary conductors of the pulse transformers being connected to the secondary energy storage means and the apparatus is characterised in that the secondary energy storage means rapidly deliver the electrical energy stored therein to the primary conductors of the pulse transformers to generate high currents therein and the said high currents fully saturate the said transformer cores and drop the core inductance to switch in the primary energy storage means via the energy transfer means.

3. The apparatus for exciting a laser according to claim 2, wherein the primary energy storage means and the secondary energy storage means comprise a plurality of capacitors, and the energy transfer means comprise pulse forming lines.

4. The apparatus for exciting a laser according to claim 3, wherein the pulse forming lines are applied with an electrical voltage approximately twice the discharge steady stage voltage.

5. The apparatus for exciting a laser according to claim 4 wherein the said at least one transformer core is made of a material selected from a group consisting of wound thin metallic glass ribbons and high frequency ferrite.

6. The apparatus for exciting a laser according to claim 2, wherein the primary energy storage means comprise a plurality of capacitors the energy transfer means comprise conducting feedthroughs which are applied with an electrical voltage below the gas self-breakdown voltage.

7. The apparatus for exciting a laser according to claim 6 wherein the said at least one transformer core is made of a material selected from a group consisting of wound thin metallic glass ribbons and high frequency ferrite.

8. The apparatus for exciting a laser according to claim 2 wherein the laser is an excimer laser and the number of the said at least one transformer is a number selected from a group consisting of two or three.

9. The apparatus for exciting a laser according to claim 5 wherein the laser is an excimer laser and the number of said at least one transformer is a number selected from a group consisting of two and three.

10. The apparatus for exciting a laser according to claim 7, wherein the laser is an excimer laser and the number of said at least one transformer is a number selected from a group consisting of two and three.

11. A method of exciting a laser having a first and second electrodes and containing a gas mixture therein comprising steps of preionizing the gas mixture, storing a sufficient electrical energy in primary energy storage means for the operation of the said laser, transfering the said sufficient electrical energy via energy transfer means in an impedance matching manner between the primary energy storage means and the first electrode in the form of a main discharge voltage pulse, generating a trigger pulse in response to the said main discharge voltage pulse, storing an electrical energy in secondary energy storage means, transfering electromagnetically the electrical energy between the secondary energy storage means and the second electrode in the form of a high voltage pulse which breaks down the gas mixture, initiating the electromagnetic energy transfer in response to the trigger pulse, the main discharge voltage pulse being longer in duration than the high voltage pulse, and the said two pulses being coincidental for a period of time to produce gas breakdown in the laser and to permit the transfering of the sufficient energy from the primary energy storage means to the laser.

12. The method of exciting a laser according to claim 11 wherein the transfering electromagnetically of the electrical energy is conducted by means of at least one pulse transformer, each having a primary conductor and a secondary conductor and magnetically coupled with each other via a transformer core, the said at least one pulse transformer being connected in series with each other with respect to the secondary conductors one end of the secondary conductors being connected to the second electrode, the other end of the secondary conductors being connected to the ground, and the primary conductors being connected to the secondary energy storage means, and the method is characterized in steps of delivering the electrical energy stored in the secondary energy storage means to the primary conductors to generate high currents therein and fully saturating the said at least one transformer core with the said high currents to drop the core inductances to switch in the primary energy storage means via the energy transfer means.

13. The method of exciting a laser according to claim 12, wherein the sufficient electrical energy stored in the primary energy storage means is transfered through pulse forming lines.

14. The method of exciting a laser according to claim 13, wherein the pulse forming lines are applied with an electrical voltage approximately twice the discharge steady state voltage.

15. The method of exciting a laser according to claim 12, wherein the sufficient electrical energy stored in the primary energy storage means is transfered through conductive feedthroughs which are applied with an electrical voltage below the gas self-breakdown voltage.

16. The method of exciting a laser according to claim 11, wherein the laser is an excimer laser.

17. The method of exciting a laser according to claim 12, wherein the laser is an excimer laser.

18. The method of exciting a laser according to claim 14, wherein the laser is an excimer laser.

19. The method of exciting a laser according to claim 15, wherein the laser is an excimer laser.

* * * * *